United States Patent [19]

Pipe et al.

[11] 4,326,384
[45] Apr. 27, 1982

[54] METHOD FOR COOLING BLOCKS OF HOT POROUS MATERIAL

[76] Inventors: William J. C. Pipe; John B. Gray, both of Studholme St., Morrinsville, New Zealand

[21] Appl. No.: 206,843

[22] Filed: Nov. 14, 1980

Related U.S. Application Data

[62] Division of Ser. No. 24,191, Mar. 27, 1979.

[51] Int. Cl.³ .............................................. F25D 25/00
[52] U.S. Cl. ........................................... 62/62; 62/70; 62/100; 426/498; 426/524
[58] Field of Search ................ 62/62, 69, 70, 100, 62/268; 426/128, 497, 498, 523, 524, 551; 99/517, 532, 533

[56] References Cited

U.S. PATENT DOCUMENTS

| | | | |
|---|---|---|---|
| 1,152,241 | 8/1915 | Tomlinson | 426/498 |
| 1,996,274 | 4/1935 | Burks, Jr. | 62/159 |
| 2,730,149 | 1/1956 | Aguilar et al. | 99/533 |
| 3,237,419 | 3/1966 | Venema | 62/56 |
| 3,296,953 | 1/1967 | Hendriksen et al. | 99/533 |
| 3,874,189 | 4/1975 | Calim | 62/306 |

FOREIGN PATENT DOCUMENTS 459829  5/1936  United Kingdom.

Primary Examiner—Ronald C. Capossela
Attorney, Agent, or Firm—Howson and Howson

[57] ABSTRACT

A method of cooling a block of porous material comprising inserting said block into a chamber, subjecting the chamber to air pressure less than that of the ambient air and inserting means into the said block to induce a flow of cooling air through the interior of the block to the said chamber, whereby the lower pressure in the chamber causes the cooling air to flow inwardly through the means inserted in the block for cooling the block.

6 Claims, 4 Drawing Figures

METHOD FOR COOLING BLOCKS OF HOT POROUS MATERIAL

This is a divisional, of application Ser. No. 24,191 filed Mar. 27, 1979.

This invention relates to a method of and apparatus for cooling blocks of hot porous material and more particularly but not exclusively for the rapid cooling of bread and the like food products.

While the invention will be hereinafter described in terms of the rapid cooling of bread and like food products, it will be apparent that the apparatus and the method herein described are suitable for the rapid cooling of blocks of porous material other than food stuffs.

When bread is removed from a baking oven, it is necessary for the bread to be cooled before any further operation such as slicing and wrapping can take place. All the presently known methods of cooling freshly baked bread are variations of conventional fan cooling in which loaves of bread are racked either manually or automatically and air is blown over their external surfaces. The time taken to cool bread by these conventional fan cooling methods varies from 90 minutes to 3 hours and requires the installation of space consuming and expensive racking equipment in the bakery. In addition the labour costs necessitated by the presently known cooling methods is high in relation to the profits.

Attempts have been made to cool bread rapidly by adopting processes such as that utilised for cooling produce such as lettuce. Such a process utilises the principle that when water is subjected to reduced pressure it evaporates more readily with attendant lowering of the temperature of the object from which the water evaporates. Thus it is known to endeavour to cool bread by subjecting the bread to pressure lower than atmospheric pressure during the cooling process. A hot loaf of bread subject to a controlled reduction in air pressure down to a maximum vacuum which is normally obtainable by commercially available vacuum pumps will undergo a decrease in temperature from about 400° F. to about 100° F. in a period of about 30 to 50 seconds. However before this cooling process, it is necessary to rack the bread or place it in compartments which must then be subjected to reduced air pressure, In any event such fall in temperature is still not sufficient to permit slicing and/or wrapping of the bread and it is still necessary to allow the bread to cool naturally even further before slicing and/or wrapping takes place so that the benefits through such cooling are largely negated. In addition a disadvantage is introduced by such known cooling processes in that the bread suffers dehydration with a consequent loss in quality.

Accordingly the invention consists of a method of cooling a block of porous material comprising inserting said block into a chamber, subjecting the chamber to air pressure less than that of the ambient air and inserting means into the said block to induce a flow of air through the interior of the block to the said chamber.

In another form the invention may also be said to consist of means to induce a flow of air from the interior to the exterior of a block of porous material comprising a chamber adapted to house said block and to be maintained during an operative cycle at an air pressure less than ambient air pressure means to locate and to grip the block within said chamber; an injector needle assembly including an injector needle adapted to enter the said block after it has been located by the said gripping means; and means to move the injector needle into said block to allow air to flow through the said needles into and through the said porous block.

A preferred form of the invention will now be described with the aid of the accompanying drawings wherein:

FIG. 1 is a side elevation of one form of the apparatus and

FIG. 2 an end view partly in section of the apparatus shown in FIG. 1.

Figure 1:
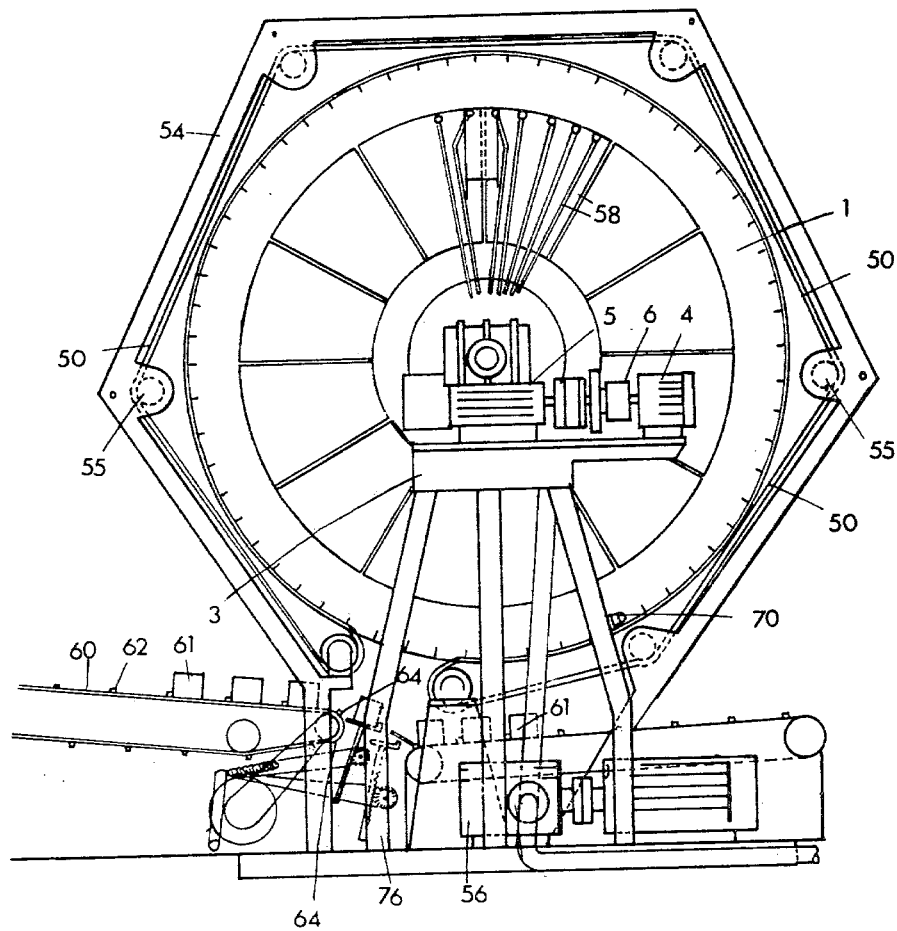

Referring to the drawings, a chamber wheel 1 is journalled on bearings 2 suitably supported on a stand 3. The chamber wheel is adapted to be rotated by means of a motor 4 driving a reduction gear-box 5 through an air operated clutch 6. The gearing is so arranged that the speed of revolution of the chamber wheel is preferably one revolution every 50 seconds, but this can be varied as required. The chamber wheel is of a size that it can carry a number of vacuum chambers 7 (see also FIG. 3) on its periphery. Each chamber, which is of a size that it will accept the largest loaf of bread that it is desired to be cooled by the apparatus, includes a loaf gripping means indicated in FIG. 3 and which will be hereinafter further described. The number of chambers 7 on the periphery of the wheel and hence the diameter and size of the wheel is set by the number of chambers required and by the speed of rotation of the wheel. In the preferred embodiment, sixty vacuum chambers 7 are arranged around the periphery of the chamber wheel. Each vacuum chamber can be formed for instance from glass reinforced, plastics material or the like and has a base 10, sidewalls 11 and end walls 12 to form a box like structure. The perimeter of the chamber wheel is provided with a cold air duct 13 which extends on either side of the vacuum chamber and which communicates with the interior of each chamber as will be hereinafter described.

Figure 3:
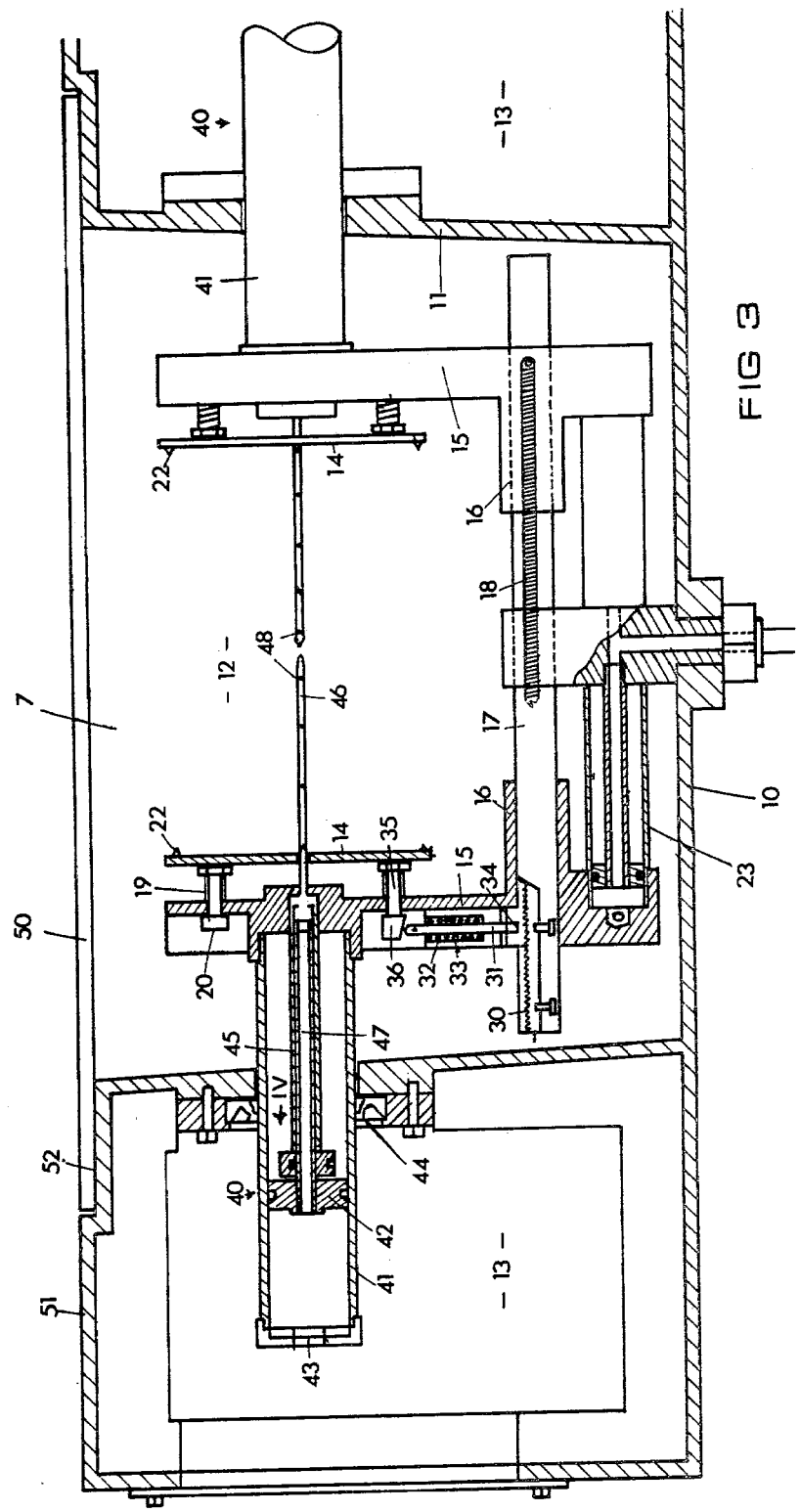
FIG. 3 is a sectional view through a vacuum chamber.
Figure 4:
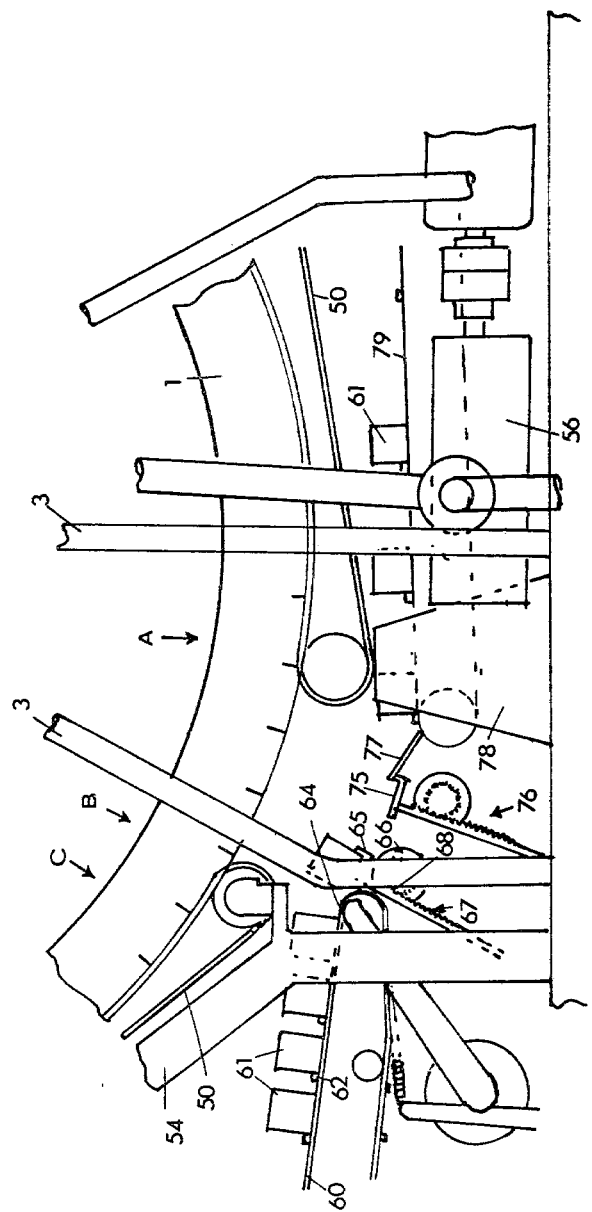
FIG. 4 is a view to a larger scale of a detail of FIG. 1.

The loaf gripper means are adapted to grip and retain a loaf of bread after it has been inserted into the chamber and are arranged so as to be automatically triggered to retain the loaf within the chamber. The gripper means may consist of two plates 14 which oppose each other and which are spaced apart as indicated in FIG. 3. The plates are attached to staunchions 15 which have sleeves 16 so that they can have a sliding movement towards and away from each other on a support rod 17. The sleeves 16 are spring loaded by means of coil springs 18 so that the two plates will normally tend to move together. The plates 14 are attached to the staunchions 15 by means of springs 19 and bolts 20 in order that the plates can be self aligning when they grip the sides or ends of the loaf. In addition, studs 22 protrude from the opposing face of each plate so as to assist in retaining the loaf after it has been gripped. A hydraulic ram 23 is arranged so that when air under pressure is let into the ram, the plates 14 will be held apart to the furthest extent. When a loaf has been inserted into the chamber as will be hereinafter described an air switch 27 is triggered so that the air under pressure within the ram is exhausted, whereupon the springs 18 will pull the plates 14 together to contact and grip the loaf of bread.

Means are also provided so that when the plates 14 have gripped the loaf of bread, further inward movement of the plates is prevented. Such further inward movement would otherwise damage the loaves which until cooled can be easily crushed. One preferred means as indicated in FIG. 3 comprises a ratchet and a pawl arrangement. The ratchet is preferably in the form of a saw tooth rack 30 formed into or as part of the support rod 17 while the pawl consists of a rod 31 slideable within a cylinder 32 and spring loaded in an upwardly direction by means of the spring 33. The lower end 34 of the pawl is so formed that when it is in its lowered position the pawl will engage the rack 30 and so prevent further inward movement of the plate. A pawl actuating lever 35 extends from the plate and terminates in a cam shaped enlargement 36 so that when the plate is pushed in the direction of the arrow III in FIG. 3 the pawl will be moved downwardly into a locking position. Thus when a loaf of bread is inserted into the chamber the hydraulic ram is actuated to spread the plates 14 and the ram then released so that the springs will act to bring the plates together so that the loaf will be gripped by the plates. When the bias of the spring 19 is overcome, the pawl will be actuated to engage the rack 30 and so prevent further inward movement of the plates.

Each vacuum chamber includes at least one and preferably two injector needle devices 40 for penetration of the loaf and for admission of the cooling air and conveniently such devices may be formed as part of the gripper means indicated in FIG. 3. Each injector needle device includes a cylinder 41 in which an injector needle assembly can have sliding movement. An air seal is formed by a gland 42 within the cylinder so that when air under pressure is let into the forward part of the cylinder, the needle assembly will move in the direction of the arrow IV and the air within the rearward part of the cylinder will exhaust through the port 43 into the cold air duct 13. The air within the cold air duct will normally be pressurised and can if desired be refrigerated. The injector needle cylinder is fixed to a gland 44 attached to the side wall 11 of the vacuum chamber so as to form an airtight seal between the vacuum chamber and the cold air duct. Such gland 44 will also support the injector needle cylinder 41 so as to correctly orientate it. When the air in the forward part of the cylinder is exhausted to atmosphere, then air under pressure within the cold air duct will pass through the port 43 and enter the rearward part of the cylinder 41 and will exert pressure on the gland 42 so as to force the injector needle assembly to the position indicated in FIG. 3 i.e. in its fully inserted position. The injector needle assembly consists of a tube 45 which is attached at one end to the gland 42 and at its other end to a hollow hypodermic needle 46 the bore of which can communicate with the bore 47 of the rod so that air can pass from the cold air duct 13 through the port 43 into the rear part of the cylinder, through the bore of the tube 45 and needle 46 and exit through the holes 48 formed in the cannula of the needle. As shown in FIG. 3 two injector needles 46 are employed and both injector needles can share a common longitudinal axis or can be offset one from the other in order to accommodate different size loaves and so as to provide a necessary form of adjustment in the cooling rate of different types of loaves. The needle 46 is therefore of a length that it can be fully retracted from the loaf of bread as required and can be inserted at least approximately half the length of the loaf held between the plates 14.

Figure 2:
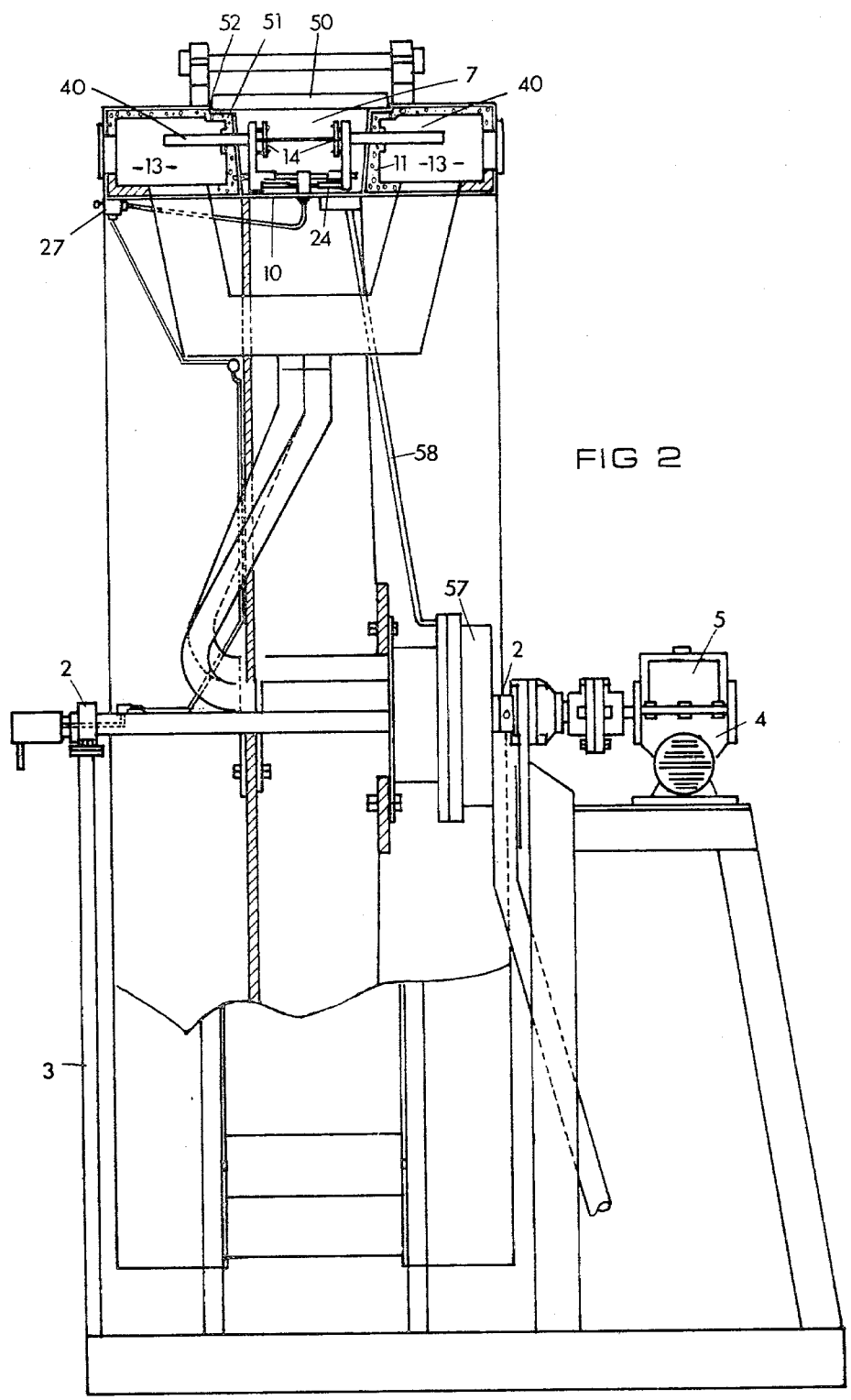

Means are also provided so that the vacuum chambers 7 can be selectively sealed as the chamber wheel rotates. As shown in the drawings this is arranged by means of an endless belt 50 which runs on the periphery 51 of the chamber wheel in recesses 52 (See FIG. 3) formed in such perimeter. The belt is constructed so that at the required degrees of rotation of the chamber wheel it will positively seal one chamber 7 from the next and will also seal each chamber 7 from ambient air pressure. The belt is an endless belt and is guided by means of a framework 54 which is fixed to the support frame 3 of the chamber wheel and which is provided with rollers 55 so that the portion of the belt which is not contacting the chamber wheel can be continuously returned and such return rund will bot contact the chamber wheel. Thus it will be apparent that as the chamber wheel rotates, each chamber 7 will be successively covered by the belt and will remain covered until it reaches the portion of the arc wherein the belt loses contact with the chamber wheel to open the chamber. Preferably spring tension (not shown in the drawings) or other means as known in the art is utilised to maintain tension on the belt so as to ensure sealing between the belt and the periphery of the chamber wheel. The belt is preferably a rubberised nylon reinforced fabric and has sufficient strength that when each vacuum chamber 7 is subjected to vacuum as will be hereinafter described, a minimum deformation of the belt will occur, so as to minimise the possibility of the belt contacting the loaf of bread within the vacuum chamber. Means are provided so that each chamber will be subjected to vacuum when the chamber wheel has rotated to its correct station. This is arranged by means of a vacuum pump connected to a rotary valve 57 (see FIG. 2) of a conventional form with the valve being connected by vacuum lines 58 to the respective vacuum chambers.

Means are also provided to insert a loaf of bread to be cooled into each vacuum chamber 7 as appropriate. One preferred method of obtaining this is shown in FIG. 1. wherein a conveyor belt 60 receives loaves 61 of bread direct from a conventional depanning machine (not shown in the drawings). The conveyor comprises a number of bars 62 attached between a pair of endless chains. Such conveyors are widely used in bread wrapping installations and are constructed so that each loaf rests against a bar 62 to ensure a predetermined distance between each loaf. When the loaf reaches the discharge end 64 of the conveyor, it is passed onto a carrier table 65 of an insertion mechanism 66. The insertion mechanism 66 is adapted to have movement in a radial direction towards the axis of the chamber wheel and this can be arranged by means of a rack 67 and pinion 68 so as to have the required radial movement. The movement of the insertion mechanism is time, for instance by the photocell unit 70, so that when the chamber wheel reaches its correct station then the photocell unit will activate either a clutch or electric switch (not shown in the drawings) so as to move the carrier table in a radial direction and to insert the loaf into the aligned chamber 7 at station A of FIG. 1. At this point the air switch 27 (see FIG. 2) will operate so that air under pressure is let into the ram 23 so as to move the plates 14 apart. When the loaf is correctly positioned within the chamber, the air switch 27 will again operate to open the ram to atmospheric pressure whereupon the plates 14 will be spring urged together by the springs 18 so that the plates will grip the loaf of bread. The carrier table 65 of the insertion mechanism is then retracted and an impulse sent to the air clutch 6 so as to engage the clutch to allow the chamber wheel to move to the next station. At the station B of FIG. 1 the belt is commencing to seal the chamber and when the chamber wheel proceeds to the next station C the belt will completely seal the chamber. At this station the chamber is subjected to vacuum by reason of the vacuum line 58 being connected through the valve 57 to the pump 56. The cold air duct will normally contain air at atmospheric or above atmospheric pressure and the difference in pressure within the cyclinder 41 will act on the gland 42 of the insertion needle assembly so that the insertion needles 46 will move and enter fully into the loaf of bread. As the chamber wheel rotates, the loaf of bread will be subjected to continuous vacuum in the chamber and cool air will flow through the loaf from the cold air duct 13 thus cooling the loaf from the inside out. When the loaf reaches station D the gripping mechanism is released and the loaf will drop onto the table 75 of the withdrawal mechanism 76 which will be in the advanced position, that is with the table adjacent to the perimeter of the chamber wheel. The table 75 is in the form of bars which cooperate with fingers 77 which project from a frame work 78 on which a discharge conveyor belt 79 is supported. When the withdrawal mechanism is retracted to the position indicated in FIG. 1 the fingers 77 will lift the loaf off the table 75 and the loaf will slide by gravity onto the discharge conveyor belt 79 where it will be conveyed to the slicing and/or packing operations.

The injector needle assemblies are so constructed that the injector needles 46 will enter either end of the loaf and will penetrate the loaf for the required distance. Thus the length of the needles will normally be selected so as to correlate with the length of loaf to be cooled. In some cases it might be desirable for the injector needles to penetrate more than half the length of loaf to be cooled and in such a case the injector needles can be suitably offset so that when they enter the loaf at either end no clashing of the needles will occur.

The vacuum which obtains within the chamber and in addition when the cold air duct is pressurised, will assist the action of the springs 18 so that the movement of the injector needles 46 into the loaf is rapid. While the preferred form of the invention utilises cold air ducts to enable air to enter through the needles into the loaf, nevertheless the bores of the injector needles can be open to atmosphere in certain circumstances. It is however desirable that the fresh air supply be as clean and as cool as possible and preferably the air should be dry although it may contain moisture in certain circumstances and it may also include other additives such as flavouring, colouring, preservatives and the like.

Because the pressure within the loaf and within the vacuum chamber is kept reasonably constant by the vacuum pump, the expansion of air as it flows through the orifices in the needle will service to further cool the air and the movement of the cool air through the pores of the loaf will quickly and rapidly cool the loaf. The amount of cooling of the loaf can be determined by the amount of time the injector needles remain within the loaf, although normally the injector needles will remain within the loaf for the full distance between stations C and D.

We claim:

1. A method of cooling a block of porous material comprising inserting said block into a chamber, subjecting the chamber to air pressure less than that of the ambient air and inserting means into the said block to induce a flow of cooling air through the interior of the block to the said chamber, whereby the lower pressure in the chamber causes the cooling air to flow inwardly through the means inserted in the block for cooling the block.

2. A method of cooling a porous product, comprising the steps of:
    providing a chamber for containing said porous product and at least one hollow injection needle having a portion with an orifice adapted to penetrate said product in said chamber and having a passage in communication with a cooling medium outside of the chamber,
    displacing said needle axially from one position spaced from said porous product to another position where said orifice is located inside said product, and
    creating in said chamber a pressure lower than the pressure of said cooling medium outside of said chamber,
    whereby the lower pressure in the chamber causes the cooling medium to flow inwardly through the injection needle into the porous product contained in the chamber for cooling the porous product.

3. A method of cooling a porous product comprising the steps of:
    providing a chamber for containing said product,
    gripping said product in said chamber,
    advancing said product while subjected to said gripping in said chamber,
    penetrating said product in said chamber with at least one hollow injector needle having one portion with at least one orifice receivable in said product and having another portion in communication with a cooling medium outside of said chamber, and
    inducing in said chamber a pressure lower than the pressure of said cooling medium outside of said chamber,
    whereby the cooling medium flows inwardly through the needle and the product into the chamber for cooling the product.

4. A method of cooling a porous product, comprising the steps of:
    providing a chamber adapted to receive said porous product,
    advancing said chamber from a product loading station to a product unloading station,
    loading said porous product into said chamber at said product loading station,
    gripping said porous product in said chamber as said chamber advances,
    penetrating said product with at least one hollow injector needle having one portion in said porous product in said chamber and having another portion in communication with a source of a cooling medium located outside of said chamber,
    creating a lower pressure in said chamber than the pressure of said cooling medium outside of said chamber as said chamber advances from said loading station to said unloading station,
    unloading said porous product from said chamber at said product unloading station, and
    disengaging said needle from said porous product prior to unloading thereof at said unloading station,
    whereby the porous product is cooled by the flow of cooling medium through the needle into the product as the product advances between the loading and unloading stations.

5. A method of cooling a porous product, comprising the steps of:

providing a plurality of chambers each having an opening sized to receive a porous product, advancing said plurality of chambers in a path of movement from a loading station to an unloading station, displacing a porous product through said opening into one of said chambers, closing said chamber opening after said porous product has been placed therein, gripping said porous product in said chamber, penetrating said porous product in said chamber after said porous product has been gripped by said gripping means to provide a flow passage communicating the inside of said porous product with a source of a cooling medium outside of said chamber, creating in each chamber as it advances a pressure lower than the pressure of said cooling medium outside of said chamber for causing the cooling medium to flow inwardly through the passage means of said penetrating means to exit from the porous product in the chamber for cooling the product, exposing said chamber opening adjacent said unloading station, and unloading said cooled porous product from said chamber.

6. A method of cooling a porous product, comprising the steps of:

providing a chamber adapted to receive said porous product, gripping said product in said chamber with movable means on opposite sides of said porous product, displacing said gripping means into and out of engagement with said porous product, sensing engagement of said gripping means with said product and arresting further inward movement of said gripping means upon a predetermined amount of sensed gripping pressure, displacing into and out of operative engagement with the interior of said porous product a pair of injector needles movable relative to and in the same direction as said gripping means and each having shanks with orifices adapted to be located inside said porous product when the needles are extended relative to the gripping means and each having a passage therewithin communicating with a cooling medium located outside of said chamber, controlling said gripping step with respect to said needle displacing step to cause said needles to penetrate said product after said product has been gripped by said gripping means, and creating in said chamber a pressure lower than the pressure of said cooling medium outside of said chamber for flowing said cooling medium through said needle and porous product into said chamber for cooling the product.

* * * * *